United States Patent [19]

Haman

[11] Patent Number: 5,737,976
[45] Date of Patent: Apr. 14, 1998

[54] CONNECTING ROD AND CRANKSHAFT ASSEMBLY

[75] Inventor: David F. Haman, Buffalo Grove, Ill.

[73] Assignee: Outboard Marine Corporation, Waukegan, Ill.

[21] Appl. No.: 847,792

[22] Filed: Apr. 28, 1997

Related U.S. Application Data

[63] Continuation of Ser. No. 442,787, May 17, 1995, abandoned.

[51] Int. Cl.$^6$ ............................. F16C 7/02; F16C 3/06
[52] U.S. Cl. .......................... 74/579 E; 74/596; 74/603
[58] Field of Search ........................... 74/25, 51, 579 R, 74/579 E, 595, 596, 603

[56] References Cited

U.S. PATENT DOCUMENTS

| | | | |
|---|---|---|---|
| 1,613,835 | 1/1927 | Kasper | 74/596 |
| 1,735,707 | 11/1929 | Worden | 74/596 |
| 1,898,153 | 2/1933 | Tamura | 74/595 |
| 1,948,814 | 2/1934 | Gibson | 74/595 |
| 2,652,728 | 9/1953 | Kiekhaefer | 74/579 E |
| 3,482,468 | 12/1969 | Biasse | 74/579 E |
| 3,739,657 | 6/1973 | Patchen et al. | 74/587 |
| 4,329,915 | 5/1982 | Schulz | 92/137 |
| 4,369,742 | 1/1983 | Everts | 123/193 P |
| 4,403,525 | 9/1983 | Bongers | 74/579 |
| 4,414,860 | 11/1983 | Brunsch et al. | 74/579 |
| 4,494,286 | 1/1985 | Kaufman | 29/156.5 |
| 4,549,445 | 10/1985 | Kaufman | 74/579 R |
| 4,691,590 | 9/1987 | Geringer et al. | 74/579 |
| 4,712,436 | 12/1987 | Brown | 74/603 |
| 4,738,234 | 4/1988 | Burgio | 74/579 E |
| 5,199,318 | 4/1993 | Hudson | 74/595 |

FOREIGN PATENT DOCUMENTS

| | | | |
|---|---|---|---|
| 1067510 | 1/1954 | France. | |
| 412596 | 4/1925 | Germany | 74/579 E |
| 208136 | 3/1960 | Germany. | |
| 2807298 | 8/1979 | Germany. | |
| 482024 | 3/1938 | United Kingdom | 74/579 E |

*Primary Examiner*—Rodney H. Bonck
*Assistant Examiner*—Mary Ann Battista
*Attorney, Agent, or Firm*—Jones, Day, Reavis & Pogue

[57] ABSTRACT

A connecting rod and crankshaft assembly comprising a crankshaft having an axis and including axially spaced end bearing surfaces in concentric relation to the axis, an arcuate throw portion extending from one of the end bearing surfaces and along a curvilinear axis and including a maximum cross section which extends perpendicularly to the curvilinear axis and which includes a maximum rectilinear distance passing through the curvilinear axis, and a crank pin extending from the throw portion in eccentric relation to the axis, a connecting rod comprising an elongated main body, and a crank pin end portion extending from the main body and including a cylindrical surface extending along an axis extending perpendicularly to the elongation of the main body and defining a crank pin aperture receiving the crank pin, and axially spaced side surfaces each including a first side surface portion located adjacent the main body and extending for an arcuate distance around the axis of less than 180 degrees, which first side surface portions are axially spaced at a first distance, and a second side surface portion located remotely from the main body and extending for an arcuate distance around the axis of more than 180 degrees, which second side surface portions are axially spaced at a second distance less than the first distance, and a bearing assembly interposed between the crank pin and the cylindrical surface of the crank pin portion of the connecting rod.

21 Claims, 3 Drawing Sheets

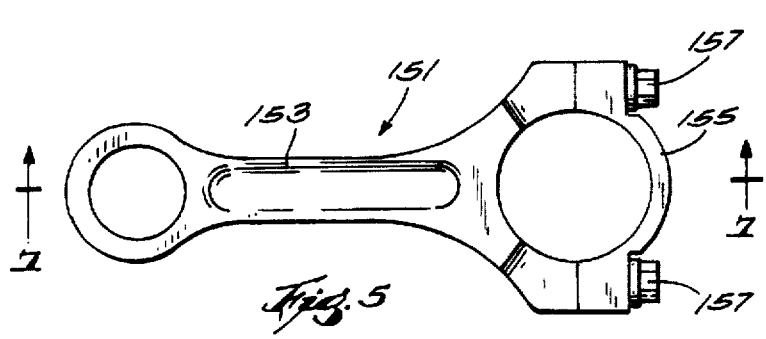
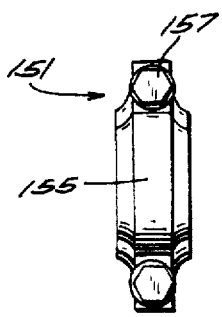
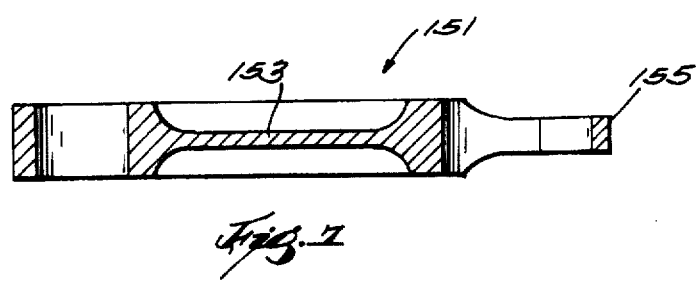
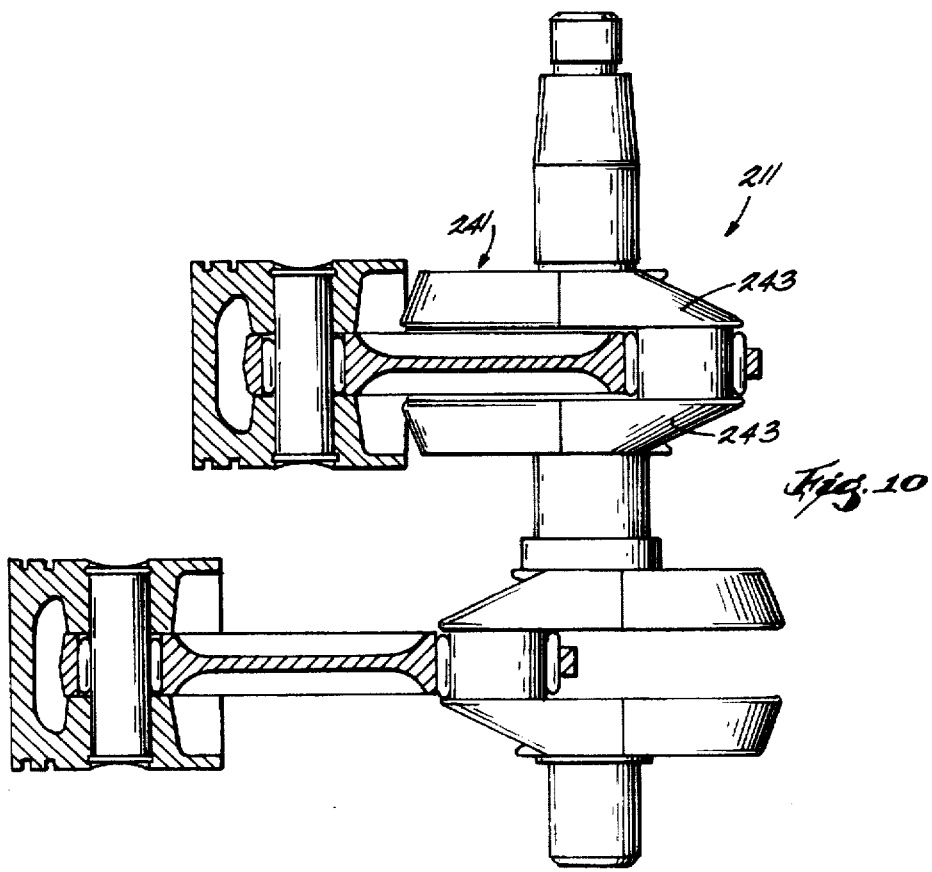

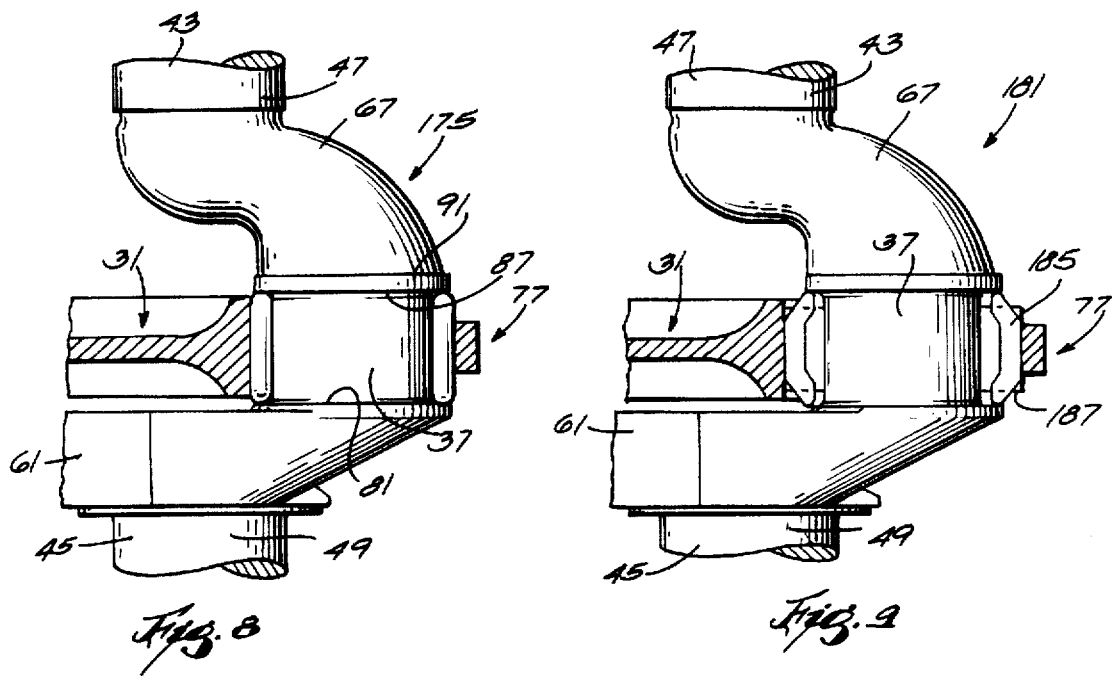
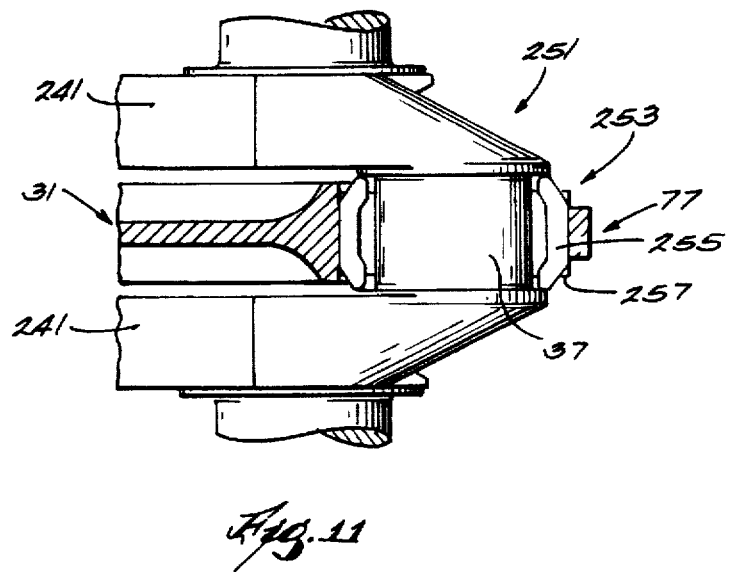

CONNECTING ROD AND CRANKSHAFT ASSEMBLY

BACKGROUND OF THE INVENTION

This is a continuation of application Ser. No. 08/442,787 filed on May 17, 1995 now abandoned.

The invention relates generally to internal combustion engines and to connecting rod and crank shaft assemblies employed therein. The invention also relates generally to connecting rod and crankshaft constructions.

In the past, it was common to secure a connecting rod to a crank pin on a one-piece crankshaft by surrounding the crank pin by one end of the main body of a connecting rod and by a connecting rod end cap, and by then connecting the connecting rod end cap to the main body of the connecting rod. Other prior alternatives included use of a multi-piece crankshaft wherein the crankshaft pieces were first assembled with the connecting rod(s) and then assembled together.

Both the one-piece and multi-piece prior crankshafts generally included counterweights at each end of a crank pin.

In prior connecting rod constructions, the crank pin aperture was generally defined by a cylindrical surface which was of the same axial length throughout.

In prior crankshaft constructions, the opposite ends of the crank pins were commonly connected to adjacent counterweights.

Attention is directed to the following:

U.S. Pat. No. 3,739,657 Issued Jun. 19, 1973
U.S. Pat. No. 4,329,915 Issued May 18, 1982
U.S. Pat. No. 4,369,742 Issued Jan. 25, 1983
U.S. Pat. No. 4,403,525 Issued Sep. 13, 1983
U.S. Pat. No. 4,414,860 Issued Nov. 15, 1983
U.S. Pat. No. 4,494,286 Issued Jan. 22, 1985
U.S. Pat. No. 4,549,445 Issued Oct. 29, 1985
U.S. Pat. No. 4,691,590 Issued Sep. 8, 1987
U.S. Pat. No. 5,199,318 Issued Apr. 6, 1993

Attention is also directed to the following foreign patents:

DT 208136 German Patent Issued Mar. 25, 1960
DT 2807298 German Patent Issued Aug. 23, 1979
No. 1,067.51 French Patent Issued Jun. 16, 1954

SUMMARY OF THE INVENTION

The invention provides a connecting rod comprising an elongated main body, and a crank pin end portion extending from said main body and including a cylindrical surface extending along an axis extending perpendicularly to the elongation of said main body and defining a crank pin aperture, said cylindrical surface including a first cylindrical surface portion located adjacent said main body and extending for an arcuate distance around said axis of less than 180 degrees and extending along said axis for a first axial distance, and a second cylindrical surface portion located remotely from said main body and extending for an arcuate distance around said axis of more than 180 degrees and extending along said axis for a second axial distance less than said first axial distance.

The invention also provides a connecting rod assembly comprising an elongated main body, a crank pin end portion extending from said main body and including a cylindrical surface extending along an axis extending perpendicularly to the elongation of said main body and defining a crank pin aperture, said cylindrical surface including a first cylindrical surface portion located adjacent said main body and extending for an arcuate distance around said axis of less than 180 degrees and extending along said axis for a first axial distance, and a second cylindrical surface portion located remotely from said main body and extending for an arcuate distance around said axis of more than 180 degrees and extending along said axis for a second axial distance less than said first axial distance, and a wrist pin portion having therein a wrist pin aperture, a piston including two facing bosses located in spaced relation to each other and on opposite sides of, and in close fitting relation to, said wrist pin portion, and a wrist pin supported by said bosses and passing through said aperture in said wrist pin portion of said connecting rod.

The invention also provides a crankshaft having an axis and including axially spaced end bearing surfaces in concentric relation to said axis, an arcuate throw portion extending from one of said end bearing surfaces and along a curvilinear axis, a crank pin extending from said throw portion in eccentric relation to said crankshaft axis and including a first end adjacent to said throw portion, a second end spaced from said throw portion, and a diameter, a counterweight located adjacent said second end of said crank pin, and an annular shoulder interposed between said first end of said crank pin and said throw portion and having a dimension which extends generally parallel to said diameter and which is greater than said diameter.

The invention also provides a crankshaft having an axis and including axially spaced first and second end bearing surfaces in concentric relation to said axis, first and second arcuate throw portions respectively extending from said first and second end bearing surfaces and along respective first and second curvilinear axes, first and second crank pins respectively extending from said first and second throw portions and in eccentric relation to said crankshaft axis and respectively including first ends respectively located adjacent said first and second throw portions, second ends respectively spaced from said first and second throw portions, and diameters, first and second counterweights respectively extending adjacent said second ends of said first and second crank pins, and first and second annular shoulders respectively interposed between said first ends of said first and second crank pins and said first and second throw portions and having respective dimensions which extend generally parallel to said diameters and which are greater than said diameters.

The invention also provides a connecting rod and crankshaft assembly comprising a crankshaft having an axis and including axially spaced end bearing surfaces in concentric relation to said axis, and a crank pin extending in eccentric relation to said axis, a connecting rod comprising an elongated main body, and a crank pin end portion extending from said main body and including a cylindrical surface extending along an axis extending perpendicularly to the elongation of said main body and defining a crank pin aperture receiving said crank pin, said cylindrical surface including a first cylindrical surface portion located adjacent said main body and extending for an arcuate distance around said axis of said cylindrical surface of less than 180 degrees, and extending along said axis of said cylindrical surface for a first axial distance, and a second cylindrical surface portion located remotely from said main body and extending for an arcuate distance around said axis of said cylindrical surface of more than 180 degrees and extending along said axis of said cylindrical surface for a second axial distance less than said first axial distance.

3

The invention also provides a connecting rod and crankshaft assembly comprising a crankshaft having an axis and including axially spaced first and second end bearing surfaces in concentric relation to said axis, first and second arcuate throw portions respectively extending from said first and second end bearing surfaces and along respective first and second curvilinear axes respectively including a maximum cross section which extends perpendicularly to the associated one of said curvilinear axes and which includes a maximum rectilinear distance passing through said associated one of said curvilinear axes, and first and second crank pins respectively extending from said first and second throw portions and in eccentric relation to said crankshaft axis, first and second connecting rods respectively including first and second elongated main bodies, and first and second crank pin end portions respectively extending from said first and second main bodies and respectively including first and second cylindrical surfaces extending along respective first and second axes respectively extending perpendicularly to the elongation of said first and second main bodies, whereby to define first and second crank pin apertures respectively located in surrounding relation to said first and second crank pins, each of said first and second cylindrical surfaces respectively including a first cylindrical surface portion located adjacent said main body and extending for an arcuate distance around said axis of said cylindrical surface of less than 180 degrees, and extending along said axis of said cylindrical surface for a first axial distance, and a second cylindrical surface portion located remotely from said main body and extending for an arcuate distance around said axis of said cylindrical surface of more than 180 degrees and extending along said axis of said cylindrical surface for a second axial distance less than said first axial distance.

The invention also provides a method of assembling a crankshaft and a connecting rod, said method comprising fabricating the crankshaft having an axis and including a bearing portion located in concentric relation to said axis, a crank pin located in eccentric relation to said axis, and a throw portion extending along a curvilinear axis between said bearing portion and said crank pin and having a cross section extending perpendicularly to said curvilinear axis and being of predetermined size, assembling a crank pin bearing in surrounding relation to, and in engagement with, the crank pin, fabricating the connecting rod with a cylindrical surface which defines a crank pin aperture having a size greater than the size of the throw portion, and which includes a first cylindrical surface portion extending for an arcuate first distance around said axis and along said axis for a first axial distance, and a second cylindrical surface portion extending for an arcuate second distance around said axis and along said axis for a second axial distance less than said first axial distance, and manipulating the connecting rod relative to the crankshaft so as to pass the bearing portion, the throw portion, and the crank pin and the crank pin bearing thereon through the crank pin aperture so as to locate the crank pin aperture in surrounding relation to and in engagement with the crank pin bearing.

Other features and advantages of the invention will become apparent to those skilled in the art upon review of the following detailed description, claims and drawings.

4

Figure 2:
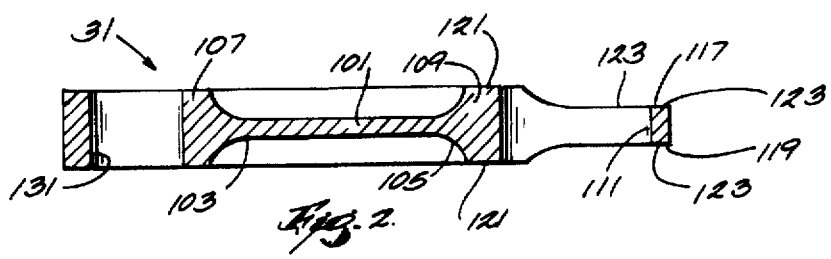
FIG. 2 is a view, partially in section, of a one piece connecting rod in accordance with the invention.
Figure 3:
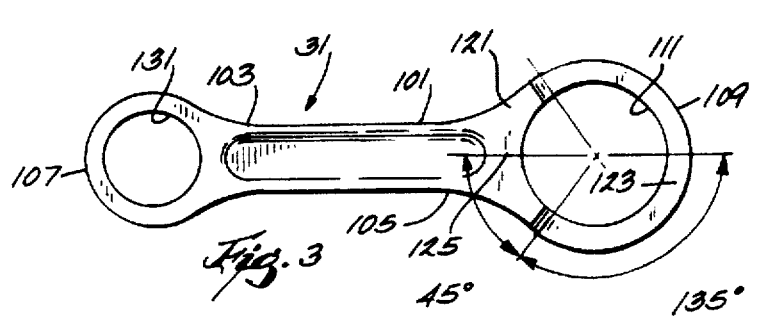

FIG. 3 is an end view of the connecting rod shown in FIG. 2.

Figure 4:
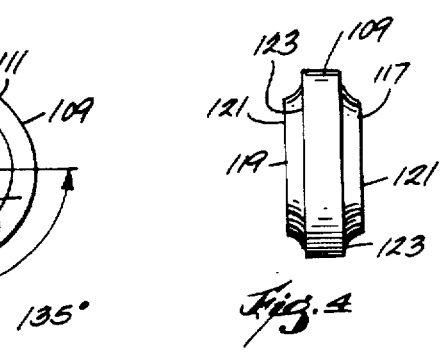

FIG. 4 is an elevational view of the connecting rod shown in FIG. 2.

FIG. 5 is an elevational view of an other embodiment of a connecting rod assembly in accordance with the invention.

FIG. 6 is an end view of the connecting rod assembly shown in FIG. 5.

FIG. 7 is a sectional view taken along line 7—7 of FIG. 5.

FIG. 8 is a fragmentary sectional view of another embodiment of a crank shaft and connecting rod assembly in accordance with the invention.

FIG. 9 is a fragmentary sectional view of yet another embodiment of a crank shaft and connecting rod assembly in accordance with the invention.

FIG. 10 is a partially sectioned view of yet another embodiment of a crank shaft and connecting rod assembly in accordance with the invention.

FIG. 11 is a partially sectioned view of yet another embodiment of a crank shaft and connecting rod assembly in accordance with the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 1:
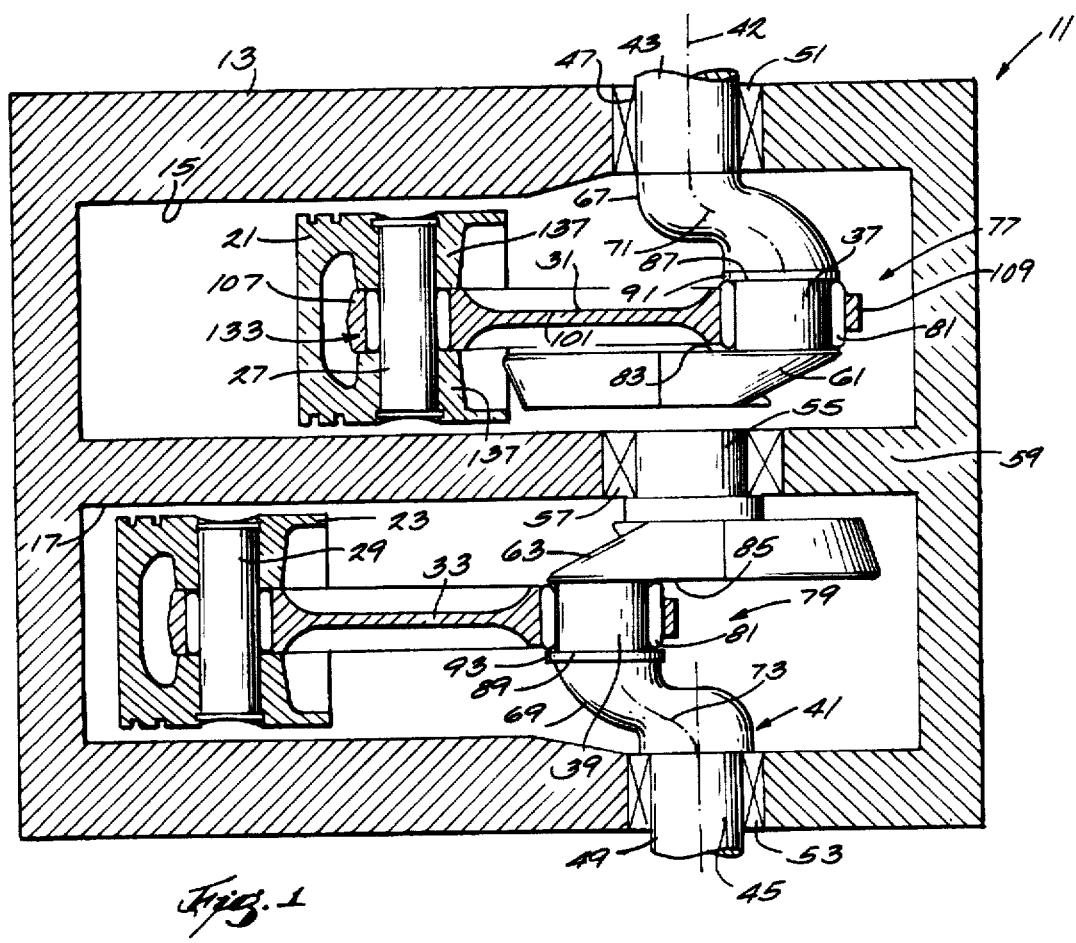
FIG. 1 is a fragmentary, partially schematic, sectional view of an internal combustion engine in accordance with the invention.

Shown schematically in FIG. 1 is a two stroke internal combustion engine 11 which embodies various of the features of the invention and which includes an engine or cylinder block 13 defining first and second cylinders 15 and 17. Respectively reciprocally moveable in the first and second cylinders 15 and 17 are first and second pistons 21 and 23 which are arranged to be alternately acting, i.e., to be 180 degrees out of phase.

The first and second pistons 21 and 23 respectively support first and second wrist pins 27 and 29 which, in turn, are respectively pivotally connected to first and second connecting rods 31 and 33 which are identically constructed, one of which is preferably of one-piece construction, and one of which is shown in FIGS. 2, 3, and 4. The first and second connecting rods 31 and 33 are respectively pivotally connected to first and second crank pins 37 and 39 which form part of a crankshaft 41 which defines a crankshaft axis 42 and which is preferably of one-piece construction.

The crankshaft 41 includes opposite first and second ends 43 and 45, and adjacent the ends, respective bearing portions 47 and 49 which are engaged by suitable bearings or journals 51 and 53 formed in, or carried by, the cylinder block 13. Centrally thereof, the crankshaft 41 also includes a central bearing portion 55 which includes axially spaced ends and which is engaged by a suitable bearing or journal 57 formed in, or carried by, a wall or partition 59 which is centrally located in the engine block 13 and which separates the first and second cylinders 15 and 17. The first and second bearing portions 47 and 49 and the central bearing portion 55 are concentric with the crankshaft axis 42, whereas as, the first and second crank pins 37 and 39 extend in parallel eccentric relation to the crankshaft axis 42 and, as already indicated, are located on opposite sides of the crankshaft axis 42 at 180 degrees from each other.

Located at the opposite first and second ends of the central bearing portion 55 are respective first and second counter-weights 61 and 63 which extend perpendicularly to the crankshaft axis 42 in generally parallel relation to each other, which are respectively joined to the axially adjacent ends of the first and second crank pins 37 and 39, and which provide the desired engine balance. Extending between the first and second crank pins 37 and 39 and the first and second bearing portions 47 and 49 are respective first and second arcuate throw portions 67 and 69. The throw portions 67 and 69 extend along respective curvilinear axes 71 and 73 which are generally "s" shape.

Located in surrounding relation to and in engagement with the first and second crank pins 37 and 39 are respective first and second bearing assemblies 77 and 79 which include a plurality of individual bearing elements, which can be of any suitable construction, and which are preferably of a roller or needle design, although other configurations could be employed. The bearing assemblies 77 and 79 can include a full complement of bearing elements 81, i.e., rollers or needles, or, as will hereinafter be described, the bearing assemblies 77 and 79 can be of a caged element configuration in which a bearing retainer provides guidance for the rolling elements.

At one end, the bearing assemblies 77 and 79 are retained against axial movement relative to the associated crank pins 37 and 39 by engagement with annular shoulders or thrust surfaces 83 and 85 formed on the adjacent counterweights 61 and 63. At the opposite ends thereof, the bearing assemblies 77 and 79 are retained against axial movement relative to the associated crank pins 37 and 39 by annular shoulders or thrust surfaces 87 and 89 respectively formed on annular ribs or rims 91 and 93 which are interposed between the adjacent crank pins 37 and 39 and throw portions 67 and 69 and which have respective outer circumferences with respective diameters of predetermined length or distance. The throw portions 67 and 69 have maximum cross sections which extend perpendicularly to the curvilinear axes 71 and 73, and which have maximum diametric distances which extend through the curvilinear axes 71 and 73 and which are no larger than the respective diameters of the ribs or rims 91 and 93 and which are preferably of somewhat lesser dimension.

As the before mentioned connecting rods 31 and 33 are identically constructed, only the connecting rod 31 will be described in detail. In this regard, the connecting rod 31 includes (see FIGS. 2, 3, and 4) an elongated main body 101 including a wrist pin end 103 and a crank pin end 105 spaced from the wrist pin end 103 in the direction of elongation. The connecting rod 31 also includes, adjacent the wrist pin end 103, a wrist portion 107, and, adjacent the crank pin end 105, a crank pin portion 109.

The crank pin portion 109 includes a cylindrical surface 111 which surrounds and engages the associated bearing assembly 77, which includes opposites ends, and which has a diameter greater then the diametrical dimension of the rim or rib 91. In addition, the crank pin portion 109 includes a pair of opposite side surfaces 117 and 119 which extend from the opposite ends of the cylindrical surface 111. Each of the side surfaces 117 and 119 includes a first side surface portion 121 located adjacent the main body 101 and a second side surface portion 123 located remotely from the main body 101.

The first side surface portions 121 are spaced from each other in the axial direction at a distance which approximates the axial length of the bearing assembly 77 and extend arcuately around the axis of the adjacent crank pin 37 for a distance of less than 180 degrees and for preferably about 45 degrees on both sides of a line 125 joining the centers of the associated wrist pin 27 and the crank pin 37.

The second or remote side surface portions 123 are spaced from each other in the axial direction at an axial distance which is less than the distance between the first side surface portions 121 and which is preferably about one half the distance between the first side surface portions 121. In addition, the second or remote side surface portions 123 extend arcuately around the axis of the associated crank pin 37 for a distance greater than 180 degrees and for preferably about 135 degrees on both sides of the line 125 joining the centers of the associated wrist pin 27 and crank pin 37.

The wrist pin portion 107 includes a cylindrical surface 131 which surrounds and engages the a bearing assembly 133 which, in turn, surrounds and engages the associated wrist pin 27. The cylindrical surface 131 extends between opposite ends and along the axis of the associated wrist pin 27 for a given length slightly greater than the axial length of the bearing assembly 133. The associated wrist pin 27 is secured in two opposing bosses 137 which are formed in the piston 21, which extend toward each other, and which are spaced from each other at a distance which extends along the axis of the wrist pin 27 and which is slightly greater than the axial length of the wrist pin portion 107 of the connecting rod 31, thereby providing a close axial fit so as to minimize axial movement of the connecting rod 31 along the wrist pin axis, and thereby also to minimize movement of the crank pin portion 109 of the connecting rod 31 along the axis of the associated crank pin 37.

Shown in FIGS. 5 through 7 is a two-piece connecting rod or connecting rod assembly 151 which includes a main body 153, an end cap 155, and two or more fasteners in the form of bolts 157 which are employed to assembly the end cap 155 to the main body 153 to form the connecting rod assembly 151. In all other regards, the construction of the connecting rod assembly 151 is substantially identical to the construction of the one-piece connecting rod 31 shown in FIGS. 2 through 4.

Shown in FIG. 8 is a connecting rod and crank shaft assembly 175 which is especially suited for employment in a single cylinder engine. This construction differs from the construction shown in FIG. 1 in that the connecting rod 33 has been omitted, as well as the associated crank pin 39, the associated counter-weight 63, and the associated throw portion 69. More particularly, in the construction shown in FIG. 8, the counter-weight 61 is connected directly to the end bearing portion 49.

Shown in FIG. 9 is another embodiment of a connecting rod and crank shaft assembly 181 which is especially suited for employment in a single cylinder engine, but which can also be utilized in multi-cylinder engines. This construction differs from the construction shown in FIG. 8 in that an alternate type of crank pin bearing assembly is utilized. Specifically, the construction shown in FIG. 9 is the same as that shown in FIG. 8, except that a bearing retainer 185 containing a plurality of bearing elements 187 is included.

Shown in FIG. 10 is another embodiment of a two cylinder internal combustion engine 211 which is generally identical to the construction shown in FIG. 1 except that a different crankshaft is employed. More specifically, the construction shown in FIG. 10 employs a prior art type crankshaft 241 which omits the curvilinear throw portions 67 and 69 and which, with respect to each cylinder, employs a pair of counterweights 243, one at each end of each crankpin. In other regards the constructions shown in FIGS. 1 and 10 are generally identical.

Shown in FIG. 11 is yet another embodiment of a connecting rod and crank shaft assembly 251 which is of generally the same construction as that shown in FIG. 10, except that a bearing assembly 253 including a retainer 255 and a plurality of bearing elements 257 (as also shown in FIG. 9) is employed.

One feature of the disclosed construction provides improved cooling and lubrication of the connecting rod crank pin bearing surfaces, of the cylindrical surface of the crank pin opening in the connecting rod, and of the crank pin, thereby improving engine durability. This advantage of the invention results from the unique configuration of the crank pin portion of the connecting rod, which configuration allows exceptional communication between the crankcase charge (the mixture of fuel, lubricating oil and air) and the cylindrical surface of the crankpin portion of the connecting rod, the crank pin, and the bearings therebetween. Such communication is afforded because a large amount of the connecting rod crank pin bearing surface is of reduced axial extent. This relatively short axial length allows a significant portion of the crank pin bearing to be exposed to the environment of the crankcase, i.e., to the mixture of fuel, oil, and air. This communication provides lubrication to the moving engine components in addition to carrying away heat. Such increased lubrication and lower operating temperature allows for a higher strength oil film on the relatively movable engine components, thereby reducing metal-to-metal contact between the moving engine components. In turn, this reduction in metal-to-metal contact results in less generation of heat and less wear on the moving engine components. As a consequence, the expected service life of these relatively moveable engine components is extended.

In addition, the reduced axial length of the cylindrical surface of the crank pin portion of the connecting rod facilitates the slip-on assembly of the connecting rod(s) and the crankshaft by affording ease of manipulation.

Still further in addition, the disclosed construction provides a connecting rod of reduced mass which is easier to balance than the prior art connecting rod designs.

In this regard, prior connecting rod designs did not employ the reduced axial length of the cylindrical surface and, as a consequence, these prior art connecting rods were of greater mass, were harder to balance, and required larger counter weights. Consequently, engines constructed in accordance with the invention can be of less weight.

Still further, the possible axial range of movement of the connecting rod along the crank pin is controlled to a narrow range as a result of the employment of a close fit between the wrist pin portion of the connecting rod and the opposed bosses of the associated piston, thereby reducing the permissible range of movement of the crank pin portion of the connecting rod relative to the associated crank pin.

Another feature of the disclosed construction provides for easier assembly of the connecting rod(s) on the crank pin(s) by allowing the assembly to be accomplished by slipping the connecting rod on to the crank pin from an end of the crankshaft. In such assembly, the crank pin bearing(s) are first installed on the crank pin(s). Then a connecting rod is slipped over an the associated crankshaft end, over the adjacent bearing portion, and then over an associated the throw portion and onto an associated crank pin. In this regard, only a single counterweight per cylinder (per crank pin) is employed, and is positioned at the end of the crank pin remote from the associated crank pin end.

When two connecting rods are employed, the second connecting rod is then assembled to the crankshaft from the other crankshaft end in a similar manner.

The crank pin bearings are axially located on the crank pins by the shoulders. The diametrical size of these shoulders is sufficiently large to provide adequate area to properly axially support the crank pin bearings, yet small enough in diameter to permit passage thereof through the crank pin aperture defined by the cylindrical surface of the crank pin portion of the connecting rod. In other words, the shoulders are slightly smaller in diameter than the diameter of the cylindrical surface of the crank pin portion of the connecting rod to allow adequate clearance between the connecting rod and the crank pin.

It is preferred that the crankshaft be constructed from a single piece of material. However multi-piece crankshafts joined together into a single unit by suitable means can also be employed. The crankshaft throw portions are configured in such a manner as to provide adequate strength while, at the same time, permitting passage of the connecting rod therealong as the connecting rod is maneuvered or manipulated from the associated crankshaft end to the associated crank pin.

The disclosed construction also provides a connecting rod and crankshaft assembly wherein a one-piece crankshaft can be employed with a one piece-connecting rod(s) and wherein consequent advantages of increased strength, durability, cost, weight, ease of assembly, and ease of service can be obtained.

While the disclosed construction has been disclosed in a two-stroke internal combustion engine, the invention is also applicable to a wide variety of machine designs, from compressor designs to other types of internal combustion engines, and to multi-cylinder designs as well as to single cylinder designs.

Various of the features of the invention are set forth in the following claims.

I claim:

1. A connecting rod comprising an elongated main body, and a crank pin end portion extending from said main body and including a cylindrical surface extending along an axis extending perpendicularly to the elongation of said main body and defining a crank pin aperture, said cylindrical surface including a first cylindrical surface portion located adjacent said main body and extending for an arcuate distance around said axis of less than 180 degrees and extending along said axis for a first axial distance, and a second cylindrical surface portion located remotely from said main body and extending for an arcuate distance around said axis of more than 180 degrees and extending along said axis for a second axial distance less than said first axial distance.

2. A connecting rod in accordance with claim 1 wherein said first cylindrical surface portion extends for about 90 degrees and said second cylindrical surface portion extends for about 270 degrees.

3. A connecting rod in accordance with claim 1 wherein said first cylindrical surface portion has an axial length, and wherein said second cylindrical surface portion has an axial length of about one half of said axial length of said first cylindrical surface portion.

4. A connecting rod assembly comprising an elongated main body, a crank pin end portion extending from said main body and including a cylindrical surface extending along an axis extending perpendicularly to the elongation of said main body and defining a crank pin aperture, said cylindrical surface including a first cylindrical surface portion located adjacent said main body and extending for an arcuate distance around said axis of less than 180 degrees and extending along said axis for a first axial distance, and a second cylindrical surface portion located remotely from said main body and extending for an arcuate distance around said axis of more than 180 degrees and extending along said axis for a second axial distance less than said first axial distance, and a wrist pin portion having therein a wrist pin aperture, a piston including two facing bosses located in spaced relation to each other and on opposite sides of, and in close fitting relation to, said wrist pin portion, and a wrist pin supported by said bosses and passing through said aperture in said wrist pin portion of said connecting rod.

5. A crankshaft having an axis and including axially spaced end bearing surfaces in concentric relation to said axis, an arcuate throw portion extending from one of said end bearing surfaces and along a curvilinear axis, a crank pin extending from said throw portion in eccentric relation to said crankshaft axis and including a first end adjacent to said throw portion, a second end spaced from said throw portion, and a diameter, a counterweight located adjacent said second end of said crank pin, and an annular shoulder interposed between said first end of said crank pin and said throw portion and having a dimension which extends generally parallel to said diameter and which is greater than said diameter.

6. A crankshaft in accordance with claim 5 wherein said counterweight extends perpendicularly with respect to said crankshaft axis.

7. A method of assembling a crankshaft and a connecting rod, said method comprising fabricating the crankshaft having an axis and including a bearing portion located in concentric relation to said axis, a crank pin located in eccentric relation to said axis, and a throw portion extending along a curvilinear axis between said bearing portion and said crank pin and having a cross section extending perpendicularly to said curvilinear axis and being of predetermined size, assembling a crank pin bearing in surrounding relation to, and in engagement with the crank pin, fabricating the connecting rod with a cylindrical surface which defines a crank pin aperture having a central axis and having a size greater than the size of the throw portion, and which includes a first cylindrical surface portion extending for an arcuate first distance around said crank pin aperture axis and along said crank pin aperture axis for a first axial distance, and a second cylindrical surface portion extending for an arcuate second distance different from said arcuate first distance around said crank pin aperture axis and along said crank pin aperture axis for a second axial distance less than said first axial distance wherein said first and second cylindrical surface portions have the same radii of curvature and define a continuous annular surface around said crank pin aperture axis, and manipulating the connecting rod relative to the crankshaft so as to pass the bearing portion, the throw portion, and the crank pin and the crank pin bearing thereon through the crank pin aperture so as to locate the crank pin aperture in surrounding relation to and in engagement with the crank pin bearing.

8. A connecting rod comprising an elongated main body, and a crank pin end portion extending from said main body and including a cylindrical surface which extends along an axis extending perpendicularly to the elongation of said main body and which defines a crank pin aperture, said cylindrical surface including a first cylindrical surface portion located adjacent said main body and extending for an arcuate first distance around said axis and extending along said axis for a first axial distance, and a second cylindrical surface portion located remotely from said main body and extending for an arcuate second distance different from said arcuate first distance around said axis and extending along said axis for a second axial distance less than said first axial distance wherein said first and second cylindrical surface portions have the same radii of curvature and define a continuous annular surface around said axis.

9. A crankshaft having an axis and including axially spaced first and second end bearing surfaces in concentric relation to said axis, first and second arcuate throw portions respectively extending from said first and second end bearing surfaces and along respective first and second curvilinear axes, first and second crank pins respectively extending from said first and second throw portions and in eccentric relation to said crankshaft axis and respectively including first ends respectively located adjacent said first and second throw portions, second ends respectively spaced from said first and second throw portions, and diameters, first and second counterweights respectively extending adjacent said second ends of said first and second crank pins, and first and second annular shoulders respectively interposed between said first ends of said first and second crank pins and said first and second throw portions and having respective dimensions which extend generally parallel to said diameters and which are greater than said diameters.

10. A crankshaft in accordance with claim 9 wherein said crankshaft further includes a central bearing surface located intermediate said first and second counterweights.

11. A crankshaft in accordance with claim 10 wherein said counterweights extend perpendicularly to said crankshaft axis.

12. A crankshaft in accordance with claim 9 wherein said crank pins are arcuately spaced at about 180 degrees from each other.

13. A connecting rod comprising an elongated main body, and a crank pin end portion extending from said main body and including a cylindrical surface which extends along an axis extending perpendicularly to the elongation of said main body and which defines a crank pin aperture, said cylindrical surface including a first cylindrical surface portion located adjacent said main body and extending for an arcuate first distance around said axis and extending along said axis for a first axial distance, and a second cylindrical surface portion located remotely from said main body and extending for an arcuate second distance around said axis greater than said first arcuate distance and extending along said axis for a second axial distance less than said first axial distance.

14. A connecting rod and crankshaft assembly comprising a crankshaft having an axis and including axially spaced end bearing surfaces in concentric relation to said axis, and a crank pin extending in eccentric relation to said axis, a connecting rod comprising an elongated main body, and a crank pin end portion extending from said main body and including a cylindrical surface extending along an axis extending perpendicularly to the elongation of said main body and defining a crank pin aperture receiving said crank pin, said cylindrical surface including a first cylindrical surface portion located adjacent said main body and extending for an arcuate distance around said axis of said cylindrical surface of less than 180 degrees, and extending along said axis of said cylindrical surface for a first axial distance, and a second cylindrical surface portion located remotely from said main body and extending for an arcuate distance around said axis of said cylindrical surface of more than 180 degrees and extending along said axis of said cylindrical surface for a second axial distance less than said first axial distance.

15. An assembly in accordance with claim 14 wherein said crank pin has opposite ends, and wherein said crankshaft further includes an arcuate throw portion extending between one of said ends of said crank pin and one of said end bearing surfaces and along a curvilinear axis and including a maximum cross section which extends perpendicularly to said curvilinear axis and which includes a maximum rectilinear distance passing through said curvilinear axis.

16. An assembly in accordance with claim 14 wherein said crank pin has opposite ends, and wherein said crankshaft further includes counterweights connected to each of said opposite ends of said crank pin.

17. An assembly in accordance with claim 14 wherein said crankshaft further includes a counterweight located between said crank pin and one of said bearing surfaces.

18. An assembly in accordance with claim 14 wherein said connecting rod also includes a wrist pin portion having therein a wrist pin aperture, and further comprising a piston including two facing bosses located in spaced relation to each other and on opposite sides of, and in close fitting relation to, said wrist pin portion and, and a wrist pin supported by said bosses and passing through said aperture in said wrist pin portion of said connecting rod.

19. A connecting rod and crankshaft assembly comprising a crankshaft having an axis and including axially spaced first and second end bearing surfaces in concentric relation to said axis, first and second arcuate throw portions respectively extending from said first and second end bearing surfaces and along respective first and second curvilinear axes respectively including a maximum cross section which extends perpendicularly to the associated one of said curvilinear axes and which includes a minimum rectilinear distance passing through said associated one of said curvilinear axes, and first and second crank pins respectively extending from said first and second throw portions and in eccentric relation to said crankshaft axis, first and second connecting rods respectively including first and second elongated main bodies, and first and second crank pin end portions respectively extending from said first and second main bodies and respectively including first and second cylindrical surfaces extending along respective first and second axes respectively extending perpendicularly to the elongation of said first and second main bodies, whereby to define first and second crank pin apertures respectively located in surrounding relation to said first and second crank pins, each of said first and second cylindrical surfaces respectively including a first cylindrical surface portion located adjacent said main body and extending for an arcuate distance around a respective one of said first and second axes of less than 180 degrees, and extending along said one axis for a first axial distance, and a second cylindrical surface portion located remotely from said main body and extending for an arcuate distance around said one axis of more than 180 degrees and extending along said one axis for a second axial distance less than said first axial distance.

20. An assembly in accordance with claim 19 wherein said crankshaft further includes a central bearing surface located intermediate said first and second crank pins and including opposite first and second ends, and first and second counterweights respectively extending between said first and second ends of said central bearing surface and said first and second crank pins.

21. An assembly in accordance with claim 19 wherein said first and second connecting rods also respectively include first and second wrist pin portions respectively having therein first and second wrist pin apertures, and further comprising first and second pistons respectively including first and second pairs of spaced and facing bosses respectively located on opposite sides of, and in close fitting relation to, said first and second wrist pin portions, and first and second wrist pins respectively supported by said first and second pairs of bosses and respectively passing through said first and second apertures in said first and second wrist pin portions of said first and second connecting rods.

\* \* \* \* \*